United States Patent
Nishihara et al.

(10) Patent No.: US 7,126,301 B2
(45) Date of Patent: Oct. 24, 2006

(54) MOTOR DRIVER

(75) Inventors: Keiji Nishihara, Kyoto (JP); Hideo Nobekawa, Nagaokakyo (JP); Hideaki Mori, Sakai (JP); Makoto Gotou, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/530,442

(22) PCT Filed: Oct. 22, 2003

(86) PCT No.: PCT/JP03/13480

§ 371 (c)(1),
(2), (4) Date: Apr. 7, 2005

(87) PCT Pub. No.: WO2004/042912

PCT Pub. Date: May 21, 2004

(65) Prior Publication Data

US 2006/0097674 A1  May 11, 2006

(30) Foreign Application Priority Data

Oct. 22, 2002 (JP) .............................. 2002-306922

(51) Int. Cl.
*H02P 6/18* (2006.01)
(52) U.S. Cl. ..................... 318/439; 318/254; 318/448; 318/459; 318/721
(58) Field of Classification Search ............... 318/138, 318/254, 432–433, 439, 448, 459, 599, 720–724; 388/928.1
See application file for complete search history.

(56) References Cited

U.S. PATENT DOCUMENTS

| | | | | | |
|---|---|---|---|---|---|
| 4,712,050 | A | * | 12/1987 | Nagasawa et al. | 318/254 |
| 5,075,608 | A | * | 12/1991 | Erdman et al. | 318/599 |
| 5,929,577 | A | * | 7/1999 | Neidorff et al. | 318/254 |
| 5,969,491 | A | * | 10/1999 | Viti et al. | 318/254 |
| 5,990,643 | A | * | 11/1999 | Holling et al. | 318/254 |
| 6,534,938 | B1 | * | 3/2003 | Wu et al. | 318/254 |

FOREIGN PATENT DOCUMENTS

| | | |
|---|---|---|
| EP | 1 098 431 A1 | 5/2001 |
| EP | 1 220 439 A2 | 7/2002 |
| JP | 2000-37089 | 2/2000 |
| JP | 2002-199776 | 7/2002 |

* cited by examiner

*Primary Examiner*—Bentsu Ro
(74) *Attorney, Agent, or Firm*—McDermott Will & Emery LLP

(57) ABSTRACT

A motor driver drives a motor composed of a rotor and plural-phase windings that generate a magnetic field for rotating the rotor, including: a plurality of transistors that operate as switches for supplying current to the windings; a position detector operable to detect a rotational position of the rotor, based on a terminal voltage of each winding; and a switching controller operable to have performed a switching method to turn the transistors to an ON state or to an OFF state for controlling the rotor at the predetermined speed by means of the position detector, wherein the switching controller further controls so as to force each of the transistors into the OFF state for a predetermined duration in a predetermined cycle, and the position detector detects only while the switching controller forcedly keeps the transistor in the OFF state.

10 Claims, 14 Drawing Sheets

MOTOR DRIVER

TECHNICAL FIELD

The present invention relates to a motor driver that performs PWM (pulse width modulation) sensorless driving.

BACKGROUND ART

The following describes a conventional motor driver.

FIG. 14 shows the structure of a conventional motor driver.

In the figure, a rotor 1010 has a magnetic field unit achieved by permanent magnets, and generates a rotation force according to mutual action of windings 1011, 1012, and 1013. A power supplier 1020 is composed of three upper power transistors and three lower power transistors, and supplies power to the windings 1011, 1012, and 1013. A position detector 1030 compares each of terminal voltages V1, V2, and V3, which are each from one terminal of the windings 1011, 1012, and 1013, respectively, with a common voltage Vc, and outputs a detection pulse signal FG in accordance with the result of comparison. A command unit 1040 outputs a speed command signal EC for controlling speed of the rotor 1010. In accordance with the signal EC, the switching controller 1050 outputs a PWM signal Wp for having the upper power transistors of the power supplier 1020 perform PWM operation. In accordance with the detection signal pulse FG and the PWM signal Wp, a distribution controller 1060 outputs upper distribution control signals N1, N2, and N3 and lower distribution control signals M1, M2, and M3 for controlling power distribution to the windings 1011, 1012, 1013. Accordingly, the power supplier 1020 supplies power to the windings 1011, 1012, and 1013, and has the motor perform PWM sensorless driving.

A further structure is disclosed in Japanese Patent Application Publication No. 2001-346394 (p. 18, paragraph no. 0051), for having position detection performed stably in order to eliminate instability in accelerated turning operation caused by lag in position detection.

A problem exists in these conventional motor drivers in that startup failure occurs easily. Startup failure occurs because the rotor 1010 is unstable in terms of position and rotates slowly at the initial startup, and therefore the back EMF (electromagnetic force) voltage that is induced in the windings 1011, 1012, and 1013 is low. Consequently, the position sensor 1030, which detects position based on the comparison results of the terminal voltage V1, V2, and V3 of the windings 1011, 1012, and 1013 with the common voltage Vc, detects erroneously.

Particularly, when having the motor perform PWM driving, induced noise that is characteristic of PWM operation is superimposed on the terminal voltage in the detection phase. As a result, the probability of the position sensor 1030 detecting erroneously further increases due to this superimposed noise.

A further conventional technique that attempts to deal with this problem is a method that fixes the position of the rotor in startup according to magnetic pull in a specific phase. However, this method is problematic because the motor driver takes longer to start up due to the additional time required to fix the position of the rotor.

In view of the stated problems, the object of the present invention is to provide a motor driver that enables stable PWM sensorless startup in PWM sensorless driving, taking into consideration the effects of noise that is characteristic of PWM operation.

DISCLOSURE OF THE INVENTION

In order to achieve the stated object, the present invention is a motor driver that drives a motor composed of a rotor and plural-phase windings that generate a magnetic field for rotating the rotor, including: a plurality of transistors that operate as switches for supplying current to the windings; a position detector operable to detect a rotational position of the rotor, based on a terminal voltage of each winding; and a switching controller operable to have performed a switching method to turn the transistors to an ON state or to an OFF state for controlling the rotor at the predetermined speed by means of the position detector, wherein the switching controller further controls so as to force each of the transistors into the OFF state for a predetermined duration in a predetermined cycle, and the position detector detects only while the switching controller forcedly keeps the transistor in the OFF state.

With this structure, detection of the position of the rotor is performed only while the switching controller forcedly keeps the transistors in the OFF state. In this period, erroneous position detection due to induced noise that is characteristic of PWM operation can be prevented, and, as a result, startup failure due to erroneous detection can be prevented. In other words, stable PWM sensorless startup is achieved.

In particular, when having the motor perform PWM driving according to the transistors performing high-frequency switching between the ON state and the OFF state, induced noise caused by current change in PWM operation is superimposed on terminal voltage of the winding that is being used for position detection. Position detection is more likely to be erroneous if performed using the terminal voltage on which this induced noise has been superimposed. Therefore, the present invention has a structure in which position detection is performed in segments in which PWM operation is forced off.

Furthermore, the present invention may be characterized in that the rotor has permanent magnets, each winding is mounted on a stator, the motor driver further includes a DC power unit that is a power supply source, the plurality of transistors is composed of a group of transistors that operate as switches for supplying power from one terminal of the DC power unit to one end of each winding, and a group of transistors that operate as switches for supplying power from another terminal of the DC power unit to another end of each winding, and the switching controller performs the control for forcing the OFF state with respect to at least transistors of one of the groups.

With this structure, it is sufficient for the switching controller to control only one of the groups of transistors. Since it is not necessary to control both the groups of transistors, the circuit structure can be simplified.

Furthermore, the present invention may be characterized in that the position detector stops detecting for a predetermined period commencing at a point at which a change from the ON state to the OFF state occurs when the switching controller forces the OFF state, and the predetermined duration relating to the switching controller forcing the OFF state is longer than the predetermined period.

With this structure, the adverse effect of ringing, which occurs during the predetermined period, on detection can be avoided.

Furthermore, the motor driver of the present invention may further include: a rotation speed determiner operable to determine whether or not a rotation speed of the rotor is at least a predetermined speed, wherein, when the rotation speed is determined to be at least the predetermined speed, the position detector detects at least while a transistor is in the ON state.

With this structure, when the rotation speed is at least the predetermined speed, the effect of induced noise that accompanies current change according to PWM operation is reduced. Therefore, position detection can be performed with even more stability.

Furthermore, the present invention may be characterized in that when the rotation speed is determined to be at least the predetermined speed, the switching controller stops forcing the OFF state.

With this structure, while the rotation speed is less than the predetermined speed, in other words, during startup when the speed is one at which erroneous detection occurs easily, erroneous detection can be prevented by forcedly turning the transistors to the OFF state. On the other hand, when the rotation speed reaches at least the predetermined speed, erroneous detection is relatively unlikely to occur compared with the when the rotation speed is less than the predetermined speed. Furthermore, a problem occurs that, when the rotation speed is at least the predetermined speed, rotation becomes unstable easily because of fluctuations in driving current due to a wide forced-off segment. Therefore, the present invention is structured such that the switching controller stops forcedly turning the transistors to the OFF state when the rotation speed reaches at least the predetermined speed. This suppresses fluctuations in driving current, and consequently achieves stable rotation.

Furthermore, the present invention may be characterized in that the position detector (a) when the rotation speed is determined not to be at least the predetermined speed, stops detecting for a first period commencing at a point at which a change from the ON state to the OFF state occurs when the switching controller forces the OFF state, and (b) when the rotation speed is determined to be at least the predetermined speed, stops detecting for a second period commencing at a point at which a transistor changes from the OFF state to the ON state, and the predetermined duration relating to the switching controller forcing the OFF state is longer than the first period.

With this structure, when the rotation speed is less than the predetermined speed, position detection is suppressed during the initial first period commencing at the point at which the transistors are forcedly changed from the ON state to the OFF state. This avoids adverse effect of ringing which is prone to occurring in this period. Furthermore, when the rotation speed reaches at least the predetermined speed, position detection is suppressed during an initial second period commencing at the point at which the transistors change from the OFF state to the ON state. This avoids adverse effect of ringing which is prone to occurring during this period.

Furthermore, the present invention may be characterized in that the rotation speed determiner performs the determination based on the result of the detection by the position detector.

With this structure, the rotation speed determiner is able to determine the rotation speed using the detection result from the position detector, without special structure being required for rotation speed determination. Therefore, the circuit structure can be simplified.

Furthermore, the present invention may be characterized in that the switching controller turns a predetermined one of the transistors to the ON state in each constant period, turning the transistor to an OFF state for a predetermined period directly before turning the transistor to the ON state.

Furthermore, the present invention may be characterized in that the predetermined cycle in which the switching controller forces the OFF state is no greater than $1/20000$ seconds.

Furthermore, the present invention may be characterized in that the position detector detects the position of the rotor by comparing a terminal voltage of each winding with a center tap voltage of all windings or with a pseudo-center tap voltage of the terminal voltages of the windings.

Furthermore, the present invention may be characterized in that the cycle in which the switching controller forces the OFF state includes a segment in which a driving current of each winding is 0, and the position detector detects during the segment.

BEST MODE FOR CARRYING OUT THE INVENTION

The following describes embodiments of the present invention with reference to the drawings.

First Embodiment

Figure 1:
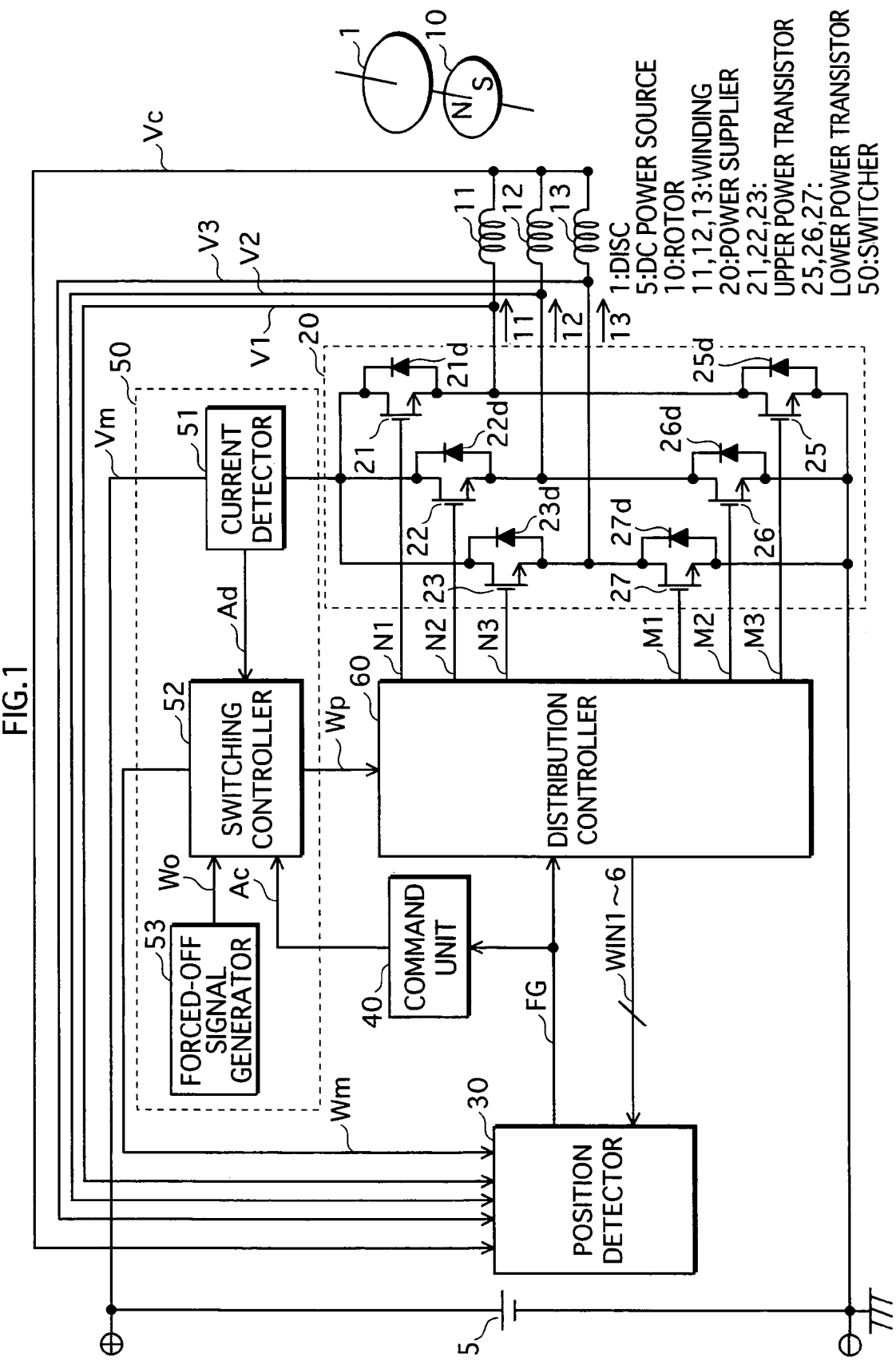
FIG. 1 shows the structure of a motor driver of a first embodiment.

FIG. 1 shows the structure of a motor driver of the first embodiment.

In the figure, a rotor 10 has a magnetic field unit attached thereto which generates a plurality of magnetic field poles using permanent magnets. Three phase windings 11, 12, and 13 are mounted on stators, which are stationary parts, and are arranged so as to be electrically shifted by 120 degrees with respect to the rotor 10. One terminal of each winding is connected to a power supplier 20, and the other terminals are commonly connected. The three phase windings 11, 12, and 13 generate three phase magnetic flux according to three phase driving voltages I1, I2, and I3, and generate driving power according by mutual action with the rotor 10. This rotates the rotor 10 and a disc 1 mounted on the rotor 10.

A DC power source 5 is the source of power. The negative terminal of the DC power source 5 is connected to earth potential and the positive terminal of the DC power source 5 supplies required DC voltage Vm. The positive terminal of the DC power source 5 is commonly connected via a current detector 51 to current input terminals of three upper power transistors 21, 22, and 23. The current output terminals of the upper power transistors 21, 22, and 23 are connected to the power supply terminals of the three phase windings 11, 12, and 13, respectively. Furthermore, the negative terminal of the DC power source 5 is commonly connected to current output terminals of three lower power transistors 25, 26, and 27. The current output terminals of the lower power transistors 25, 26, and 27 are connected to power supply terminals of the three phase windings 11, 12, and 13, respectively. In addition, upper power diodes 21$d$, 22$d$, and 23$d$ are connected anti-parallel with the upper transistors 21, 22, and 23, respectively, and lower power diodes 25$d$, 26$d$, and 27$d$ are connected anti-parallel with the lower transistors 25, 26, and 27, respectively. Note that N-channel field effect power transistors are used for the upper power transistors 21, 22, and 23 and the lower power transistors 25, 26, and 27, and parasite diodes that are formed in anti-parallel connection with each of the N-channel field effect power transistors are used as the upper power diodes 21$d$, 22$d$, and 23$d$, and the lower power diodes 25$d$, 26$d$, and 27$d$, respectively.

The power supplier 20 is composed of the upper power transistors 21, 22, and 23, the lower power transistors 25, 26, and 27, the upper power diodes 21$d$, 22$d$, and 23$d$, and the lower power diodes 25$d$, 26$d$, and 27$d$. The upper power transistors 21, 22, and 23 open and close power supply paths between the positive terminal of the DC power source 5 and the power supply terminal of each of the three-phase windings 11, 12, and 13 in accordance with upper power distribution control signals N1, N2, and N3 from a distribution controller 60, thereby forming current paths that supply positive current of the driving currents I1, I2, and I3 to the three-phase windings 11, 12, and 13. Upper power control distribution signals N1, N2, and N3 serve as digital PWM signals in each power distribution segment, according to a PWM signal Wp from a switching controller 52. In other words, the upper power transistors 21, 22, and 23 perform high-frequency switching operation. The lower power transistors 25, 26, and 27 open and close power supply paths between the negative terminal of the DC power source 5 and the negative terminal of each of the three-phase windings 11, 12, and 13 in accordance with lower power distribution control signals M1, M2, and M3 from the distribution controller 60, thereby forming current paths that supply negative current of the driving currents I1, I2, and I3 to the three-phase windings 11, 12, and 13. Note that structure and operation of the switching controller 52 are described in detail later.

Figure 2:
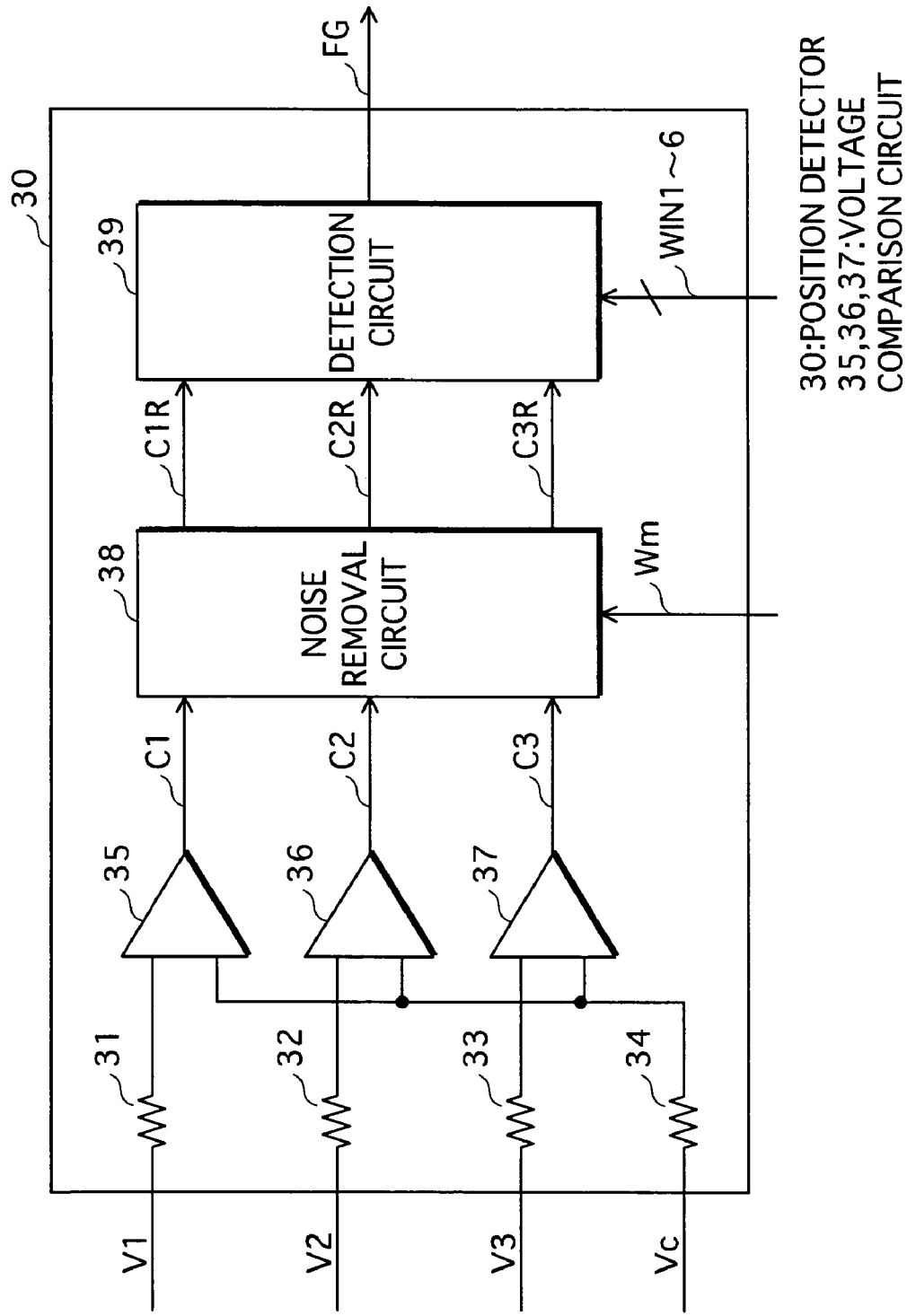
FIG. 2 shows detailed structure of a position detector 30.

The position sensor 30 detects the rotational position of the disc 1 and the rotor 10, and outputs a detection pulse signal FG corresponding to the detection result. FIG. 2 shows detailed structure of the position sensor 30. The position sensor 30 is composed of four input resistors 31, 32, 33, and 34, three voltage comparison circuits 35, 36, and 37, a noise removal circuit 38, and a detection circuit 39. The terminal voltages V1, V2, and V3 respectively generated in one terminal of each of the three phase windings 11, 12, and 13 are respectively input, with a common connection center tap voltage Vc, to the voltage comparison circuits 35, 36, and 37 via the input resistors 31, 32, and 33. The voltage comparison circuits 35, 36, and 37 compare the terminal voltages V1, V2, and V3 with the center tap voltage Vc, and output voltage comparison signals C1, C2, and C3 in accordance with the comparison results. The noise removal circuit 38 removes switching noise caused by high-frequency switching operation from the voltage comparison signals C1, C2, and C3 of the voltage comparison circuits 35, 36, and 37, and outputs voltage comparison signals C1R, C2R, and C3R obtained as a result of the noise removal. Note that a mask signal Wm from the switching controller 52 is used in the noise removal. This mask signal Wm is described in detail later. Next, the detection circuit 39 detects the position of the disc 1 and the rotor 10 using the noise-removed voltage comparison signals C1R, C2R, and C3R from the noise removal circuit 38 and detection window signals WIN 1–6 from the distribution controller 60, and outputs a detection pulse signal FG corresponding to the detection result. The detection pulse signal FG is input to the command unit 40 and the distribution controller 60.

Detection windows WIN 1–6 are described here. The detection window signals WIN 1–6 are output from the distribution controller 60, and correspond to the zero cross of the rising edge and falling edge of the back EMF voltage induced in the three-phase windings 11, 12, and 13 in respective non-power distribution phases. For example, the detection window signal WIN 1 is a window for detecting rising edge zero cross of the back EMF voltage of the winding 11, and the detection window signal WIN 2 is a window for detecting falling edge zero cross of the back EMF voltage of the winding 13. In this way, the detection window signals WIN 1–6 are electrically shifted by a 60 degree electrical angle.

The command unit 40 is composed of a speed control circuit that controls so that the disc 1 and the rotor 10 rotate at a predetermined speed. The command unit 40 detects the rotation speed of the disc 1 and the rotor 10 according to the detection pulse signal FG from the position detector 30, and outputs a speed command signal Ac that varies in accordance with a difference between the detected speed and a target rotation speed.

Figure 3:
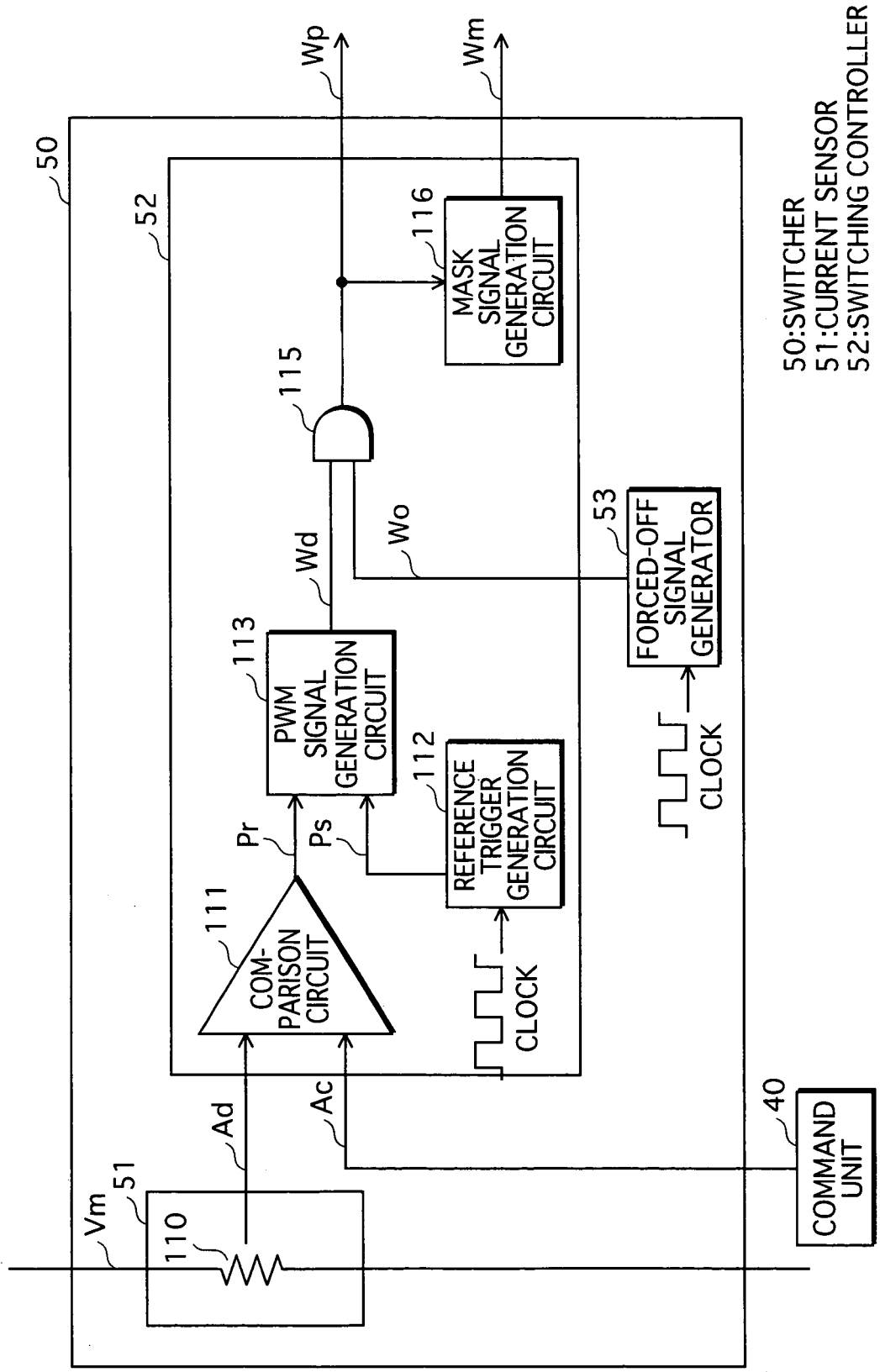
FIG. 3 shows detailed structure of a switcher 50.

A switcher 50 is composed of the current detector 51, the switching controller 52, and a forced-off signal generator 53. FIG. 3 shows detailed structure of the switcher 50. The current detector 51 is composed of a current detection resistor 110, and outputs a current detection signal Ad that is proportionate to the current supplied to the three-phase windings 11, 12, and 13 from the positive terminal of the DC power 5 via the upper power transistors 21, 22, and 23.

The forced-off control generator 53 outputs a forced-off signal Wo that reaches a low level every constant cycle To. This forced-off signal Wo is input into the switching controller 52. The switching controller 52 compares the current detection signal Ad from the current detector 51 with the speed command signal Ac from the command unit 40, outputs a PWM reset signal Pr in accordance with the comparison result, and outputs the PWM signal Wp and the mask signal Wm that correspond to the PWM reset signal Pr. The PWM signal Wp is input into the distribution controller 60, and the mask signal Wm is input into the noise removal circuit 38 of the position detector 30. The PWM signal Wp is for having the upper power transistors 21, 22, and 23 of the power supplier 20 perform high frequency switching operation (PWM operation).

Note that the motor driver of the first embodiment may instead be structured such that the current detector 51 is between the negative terminal of the DC power supply 5 and the lower power transistors 25, 26, and 27.

Figure 4:
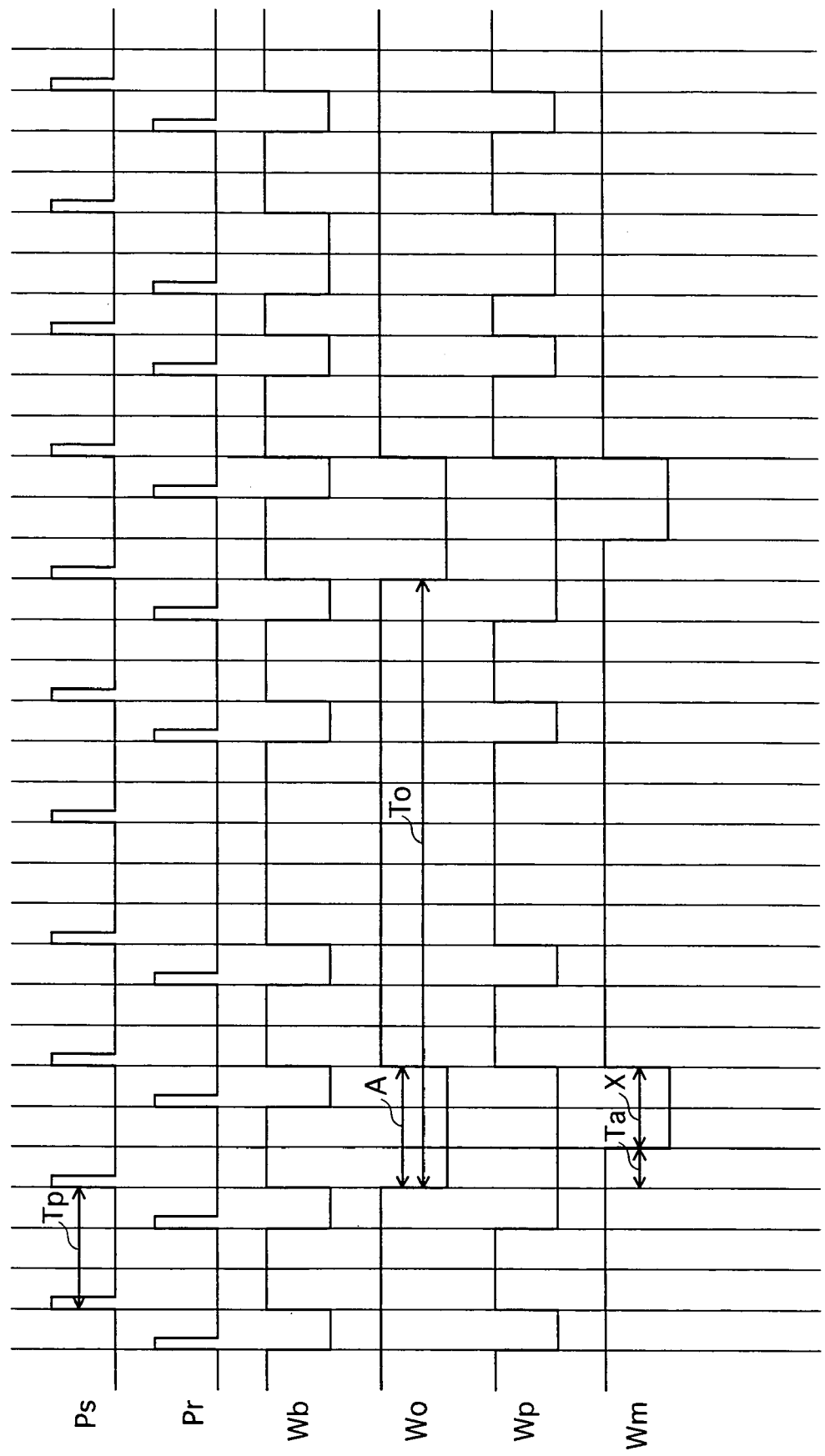
FIG. 4 shows the relationship between the waveform of each signal of a switching controller 52.

The switching controller 52 includes a comparison circuit 111, a reference trigger generation circuit 112, a PWM signal generation circuit 113, an AND gate 115, and a mask signal generation circuit 116. The comparison circuit 111 compares the current detection signal Ad from the current detector 51 with the speed command signal Ac from the command unit 40, and outputs a PWM reset signal Pr that varies in accordance with the comparison result. Specifically, when the current detection signal Ad becomes higher than the speed command signal Ac, the PWM reset signal changes from the low level to the high level. The reference trigger generation circuit 112 outputs a reference trigger signal Ps at a constant cycle Tp. Specifically, 1/Tp is a value between 20 kHz and 500 kHz, inclusive. The PWM signal generation circuit 113 outputs a basic PWM signal Wb according to the PWM reset signal Pr from the comparison circuit 111 and the reference trigger signal Ps from the reference trigger generation circuit 112. The relationship between the reference trigger signal Ps, the PWM reset signal Pr, and the basic PWM signal Wb is shown in FIG. 4. The basic PWM signal Wb changes to the high level on the rising edge of the reference trigger signal Ps in the constant cycle Tp, and changes to the low level according to the rising edge of the PWM reset signal Pr. In this way, the basic PWM signal Wb is a PWM signal that corresponds to the result of the comparison of the current detection signal Ad and the speed command signal Ac. In other words, the duty of the basic PWM signal Wb varies in accordance with the speed command signal Ac from the command unit 40. Specifically, when the actual rotation speed of the disc 1 and the rotor 10 is slower than the target rotation speed, the speed command signal Ac from the command unit 40 is high, and the ON duty of the basic PWM signal Wb increases. Conversely, when the actual rotation speed of the disc 1 and the rotor 10 is faster than the target rotation speed, the speed command signal Ac from the command unit 40 is low, and the ON duty of the basic PWM signal Wb decreases. Furthermore, when the target rotation speed and the actual rotation speed of the disc 1 and the rotor 10 are substantially equal, the speed command signal Ac from the command unit 40 has a value that corresponds to the target rotation speed, and the ON duty of the basic PWM signal Wb also has a value that substantially corresponds to the target rotation speed.

As has been described, the rotation speed of the disc 1 and the rotor 10 is controlled by detecting the actual rotation speed using the detection pulse signal FG of the position detector 30, outputting a speed command signal Ac that varies in correspondence with the difference with the target rotation speed, and varying the ON duty of the basic PWM signal Wb in accordance with the speed command signal Ac.

The forced-off signal generator 53 outputs a forced-off signal Wo that forcedly sets the upper power transistors 21, 22, and 23 of the power supplier 20 to OFF every constant cycle To. This forced-off signal Wo is input into one of the input terminals of the AND gate 115 of the switching controller 52, and the basic PWM signal Wb from the PWM signal generator 113 is input into the other input terminal. The AND gate 115 performs AND synthesis and outputs the PWM signal Wp. The relationship between the waveforms of signals of the switching controller 52 is shown in FIG. 4. The upper power transistors 21, 22, and 23 of the power supplier 20 perform high frequency switching operation according to this PWM signal Wp. In other words, in addition to high frequency switching according to the basic PWM signal Wb, forced-off operation is performed forcedly every constant cycle To, according to the forced-off signal Wo. At this time, since the current is cut off every constant cycle To according to the forced-off signal Wo, a problem of noise arises if the repetition frequency 1/To of the forced-off signal Wo is within an audible frequency range. For this reason, it is preferable to set the repetition frequency 1/To of the forced-off signal Wo to be outside the audible frequency range, specifically, to 200 kHz or above. In other words, it is preferable that To is no greater than $\frac{1}{20000}$ seconds. Note that forced-off operation according to the forced-off signal Wo is not limited to being performed every constant cycle Tp such as in the motor driver of the present embodiment, but may be performed in arbitrary cycles, or with arbitrary timing.

The PWM signal Wp is also input into the mask signal generator 116. The mask signal generator 116 outputs the mask signal Wm which is for removing noise, which is caused by high-frequency switching, that is superimposed on the voltage comparison signals C1, C2, and C3 from the voltage comparison signals C1, C2, and C3 in the noise removal circuit 38 of the position detector 30. The high level segments of the mask signal Wm are segments in which high frequency switching noise is masked, while the low level segments are segments in which position detection is possible. In the motor driver of the present first embodiment, the mask signal Wm masks in all segments other than the forced-off segment, and further masks for a first predetermined period Ta after forced-off. Consequently, the only segment in which the rotational position of the disc 1 and the rotor 10 is able to be detected is a segment X, which is the forced-off segment A with the exclusion of the first predetermined period Ta. In other words, position detection is performed only in the forced-off segment. Note that the forced-off segment A must be set to be longer than the first predetermined period Ta that proceeds forced-off (A>Ta).

The distribution controller 60 outputs the upper power distribution signals N1, N2, and N3 and lower power distribution signals M1, M2, and M3 that vary in correspondence to the detection pulse signal FG from the position detector 30, thereby controlling power distribution from the upper power transistors 21, 22, and 23 and the lower power transistors 25, 26, and 27 of the power supplier 20 to the three-phase windings 11, 12, and 13. The upper power distribution signals N1, N2, and N3 are AND synthesized with the PWM signal Wp from the switching controller 52. The upper power transistors 21, 22, and 23 perform high-frequency switching operation according to upper power distribution signals N1, N2, and N3 (PWM signal WP), and the lower power transistors 25, 26, and 27 perform full-on operation according to the lower power distribution signals M1, M2, and M3. More specifically, while power is being distributed from the winding 11 to the winding 12, the upper power transistor switch 21 performs high-speed switching operation according to the upper power distribution signal N1, and the lower power transistor 26 performs full-on operation according to the lower power distribution signal M2. When the upper power transistor 21 is performing ON operation according to the PWM signal Wp, the upper power transistor 21 supplies positive current from the positive terminal of the DC power source 5 to the winding 11, and the lower power transistor 26 supplies negative current from negative terminal of the DC power source 5 to the winding 12. Next, when the PWM signal Wp is off, since the positive current that was flowing in the winding 11 attempts to continue flowing due to the inductance action of the winding, positive current is supplied to the winding 11 by the same-phase lower power diode 25d. In this way, PWM operation is performed. Furthermore, as described earlier, the distribution controller 60 also outputs the detection window signals WIN 1–6 that vary according to the detection pulse signal FG from the position detector 30.

The motor driver of the present first embodiment performs PWM sensorless driving with the above-described structure. Generally, since it is necessary to detect the rotational position of the disc 1 and the rotor 10 in sensorless driving, sensorless driving of a motor is performed by providing a non-power distribution segment, in other words, by providing a segment in which same-phase upper and lower power transistors in the power supplier 20 are OFF, and performing zero cross detection of the back EMF voltage induced in the corresponding winding in that segment. However, since the rotor is unstable in terms of position and rotates slowly at initial startup, the back EMF voltage induced in the three-phase windings 11, 12, and 13 is low, and, consequently, position detection is difficult. This causes the conventional problem of start up failure in sensorless driving. In particular, it was found that, when having the motor perform PWM driving, induced noise that accompanies changes in current according to PWM driving is superimposed on the detection phase terminal voltage. Consequently, in sensorless startup, the position is erroneously detected due to the effect of induced noise, and startup failure occurs easily. In this way, induced noise is generated accompanying current changes in PWM operation, and the adverse effects thereof are particularly great in position detection during initial startup.

Here, induced noise is described. Induced noise is voltage generated as a result of a change in current according to PWM operation. Describing induced noise in more detail, in the power supplier 20 of FIG. 1, the upper power transistor 21 is made to perform PWM operation, and the lower power transistor 27 is made to perform full-on operation. In this state, power is distributed from the winding 11 to the winding 13, and the detection phase is winding 12. Ordinarily, when the motor is not rotating, the center tap voltage Vc at the common connection point and the terminal voltage V2 of the detection phase (winding 12) are equal, and the difference voltage therebetween should be 0. However, when PWM operation is performed, induced noise, which is a phenomenon characteristic of PWM operation, is superimposed on the detection phase terminal voltage V2 with respect to the center tap voltage Vc. Induced noise is voltage generated accompanying current change according to PWM operation, however, the value of the induced noise is the opposite one of positive or negative to the current change amount. Furthermore, the level of induced noise varies depending on the current change amount.

One method for startup is to fix the position of the rotor according to magnetic pull in a specific phase, and having the motor start after the position of the disc 1 and the rotor 10 has been fixed. Although stable sensorless startup can be achieved by first fixing the initial position before startup in this way, fixing the initial position takes time. For this reason, a method of performing forced synchronized driving at startup and then switching to sensorless driving is often employed. With a structure such as that of the present first embodiment in which the peak of driving current of the three windings 11, 12, and 13 is detected by the current detector 51, the ON duty of the PWM signal WP directly after startup is great, specifically, approximately 100%. In other words, position detection is performed almost all the time in PWM operation ON section. Conventionally, in such a case, induced noise that accompanies positive voltage change according to PWM operation is superimposed on the detection phase terminal voltage, causing erroneous detection of the position and resulting in startup failure.

In light of this problem, the motor driver of the first embodiment has a structure in which an OFF segment is provided and position detection is performed in the OFF segment. Specifically, the forced-off signal generator 53 provided in the switcher 50 outputs a forced-off signal Wo that forcedly turns off the upper power transistors 21, 22, and 23 of the power supplier 20 every constant cycle To, and the position detector 30 performs position detection only in the forced-off segment. As a result of position detection operations being performed only in the forced-off segment, position detection is performed with the negative current change. Consequently, the induced noise at the time of position detection is of the opposite one of positive and negative to the induced noise that accompanied current change. Such a structure enables stable PWM sensorless startup.

Note that the forced-off segment A may be any length of time that is longer than the first predetermined period Ta (A>Ta). Specifically, the time of forced-off segment A is a value of at least 3 µs and no more than 20 µs. Furthermore, as one example of a way to further reduce the effects of induced noise, the forced-off segment A may be set to be sufficiently long for the driving current to become 0, and position detection is performed in the segments when the driving current is 0. Since current change according to PWM operation does not occur in the segments in which the driving current is 0, induction noise does not occur. In other words, the influence of induced noise can be disregarded.

Second Embodiment

Figure 5:
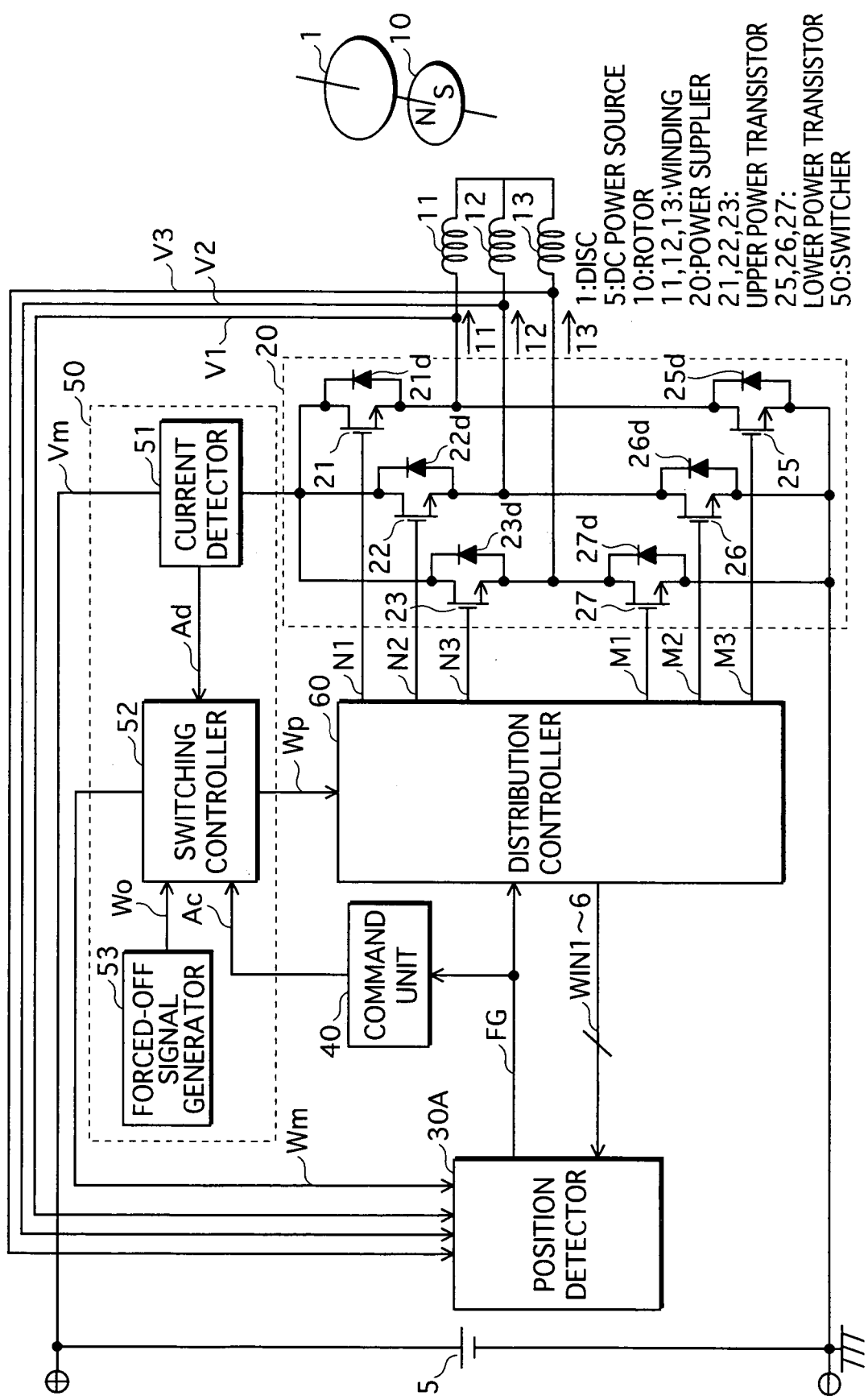
FIG. 5 shows the structure of a motor driver of a second embodiment.

FIG. 5 shows the structure of a motor driver of the second embodiment. In the motor driver of FIG. 1, a center tap voltage Vc of a common connection point of the terminal voltages V1, V2, and V3 from one terminal of each of the three-phase windings 11, 12, and 13 is input into the position detector 30, and the position detector 30 detects the rotational position of the disc 1 and the rotor 10. In contrast, in the motor driver of the present second embodiment, only the terminal voltages V1, V2, and V3 of the three-phase windings 11, 12, and 13 are input into a position detector 30A, and the position detector 30A detects the rotational position without using the center tap voltage Vc.

Figure 6:
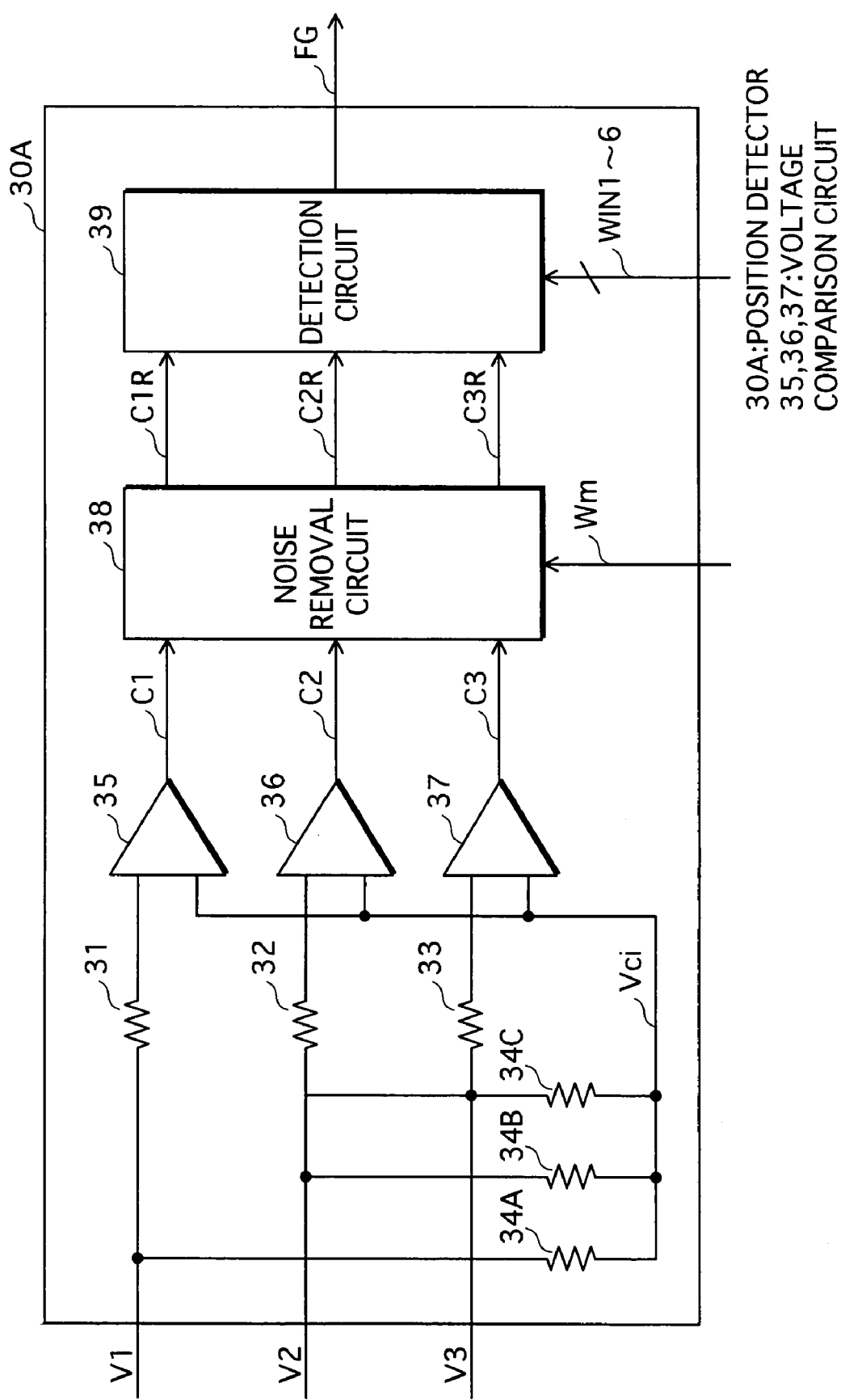
FIG. 6 shows detailed structure of a position detector 30A.

FIG. 6 shows detailed structure of the position detector 30A. The terminal voltages V1, V2, and V3 that occur at one terminal of each of the three-phase windings 11, 12, and 13 are respectively input into the input terminals of the voltage comparison circuits 35, 36, and 37 via the input resistors 31, 32, and 33. A center tap voltage Vci, which is a pseudo-center tap voltage of the terminal voltages V1, V2, and V3 that occur in one terminal of the three-phase windings 11, 12, and 13, is input into the other input terminal of each of the voltage comparison circuits 35, 36, and 37. The pseudo-center tap voltage Vci is generated by connecting resistors 34A, 34B, and 34C to the terminal voltages V1, V2, and V3, respectively, and commonly connecting one terminal of each of the resistors 34A, 34B, and 34C. The voltage comparison circuits 35, 36, and 37 directly compare the terminal voltages V1, V2, and V3, which occur in one terminal of the three-phase windings 11, 12, and 13, with the pseudo-center tap voltage Vci. Circuit structure subsequent to the voltage comparison circuits 35, 36, and 37 is identical to that of the first embodiment, and rotational position detection is performed using only the terminal voltages V1, V2, and V3 that occur in one terminal of each of the three-phase windings 11, 12, and 13.

With the described structure, it is sufficient for three voltages to be input into the position detector 30A, specifically, the terminal voltages V1, V2, and V3 that occur in one terminal of each of the three-phase windings 11, 12, and 13. This is one less input voltage than in the motor driver of the first embodiment. In other words, the motor driver can be constructed with one less wire from the center tap voltage to the position detector 30A and one less terminal.

Third Embodiment

Figure 7:
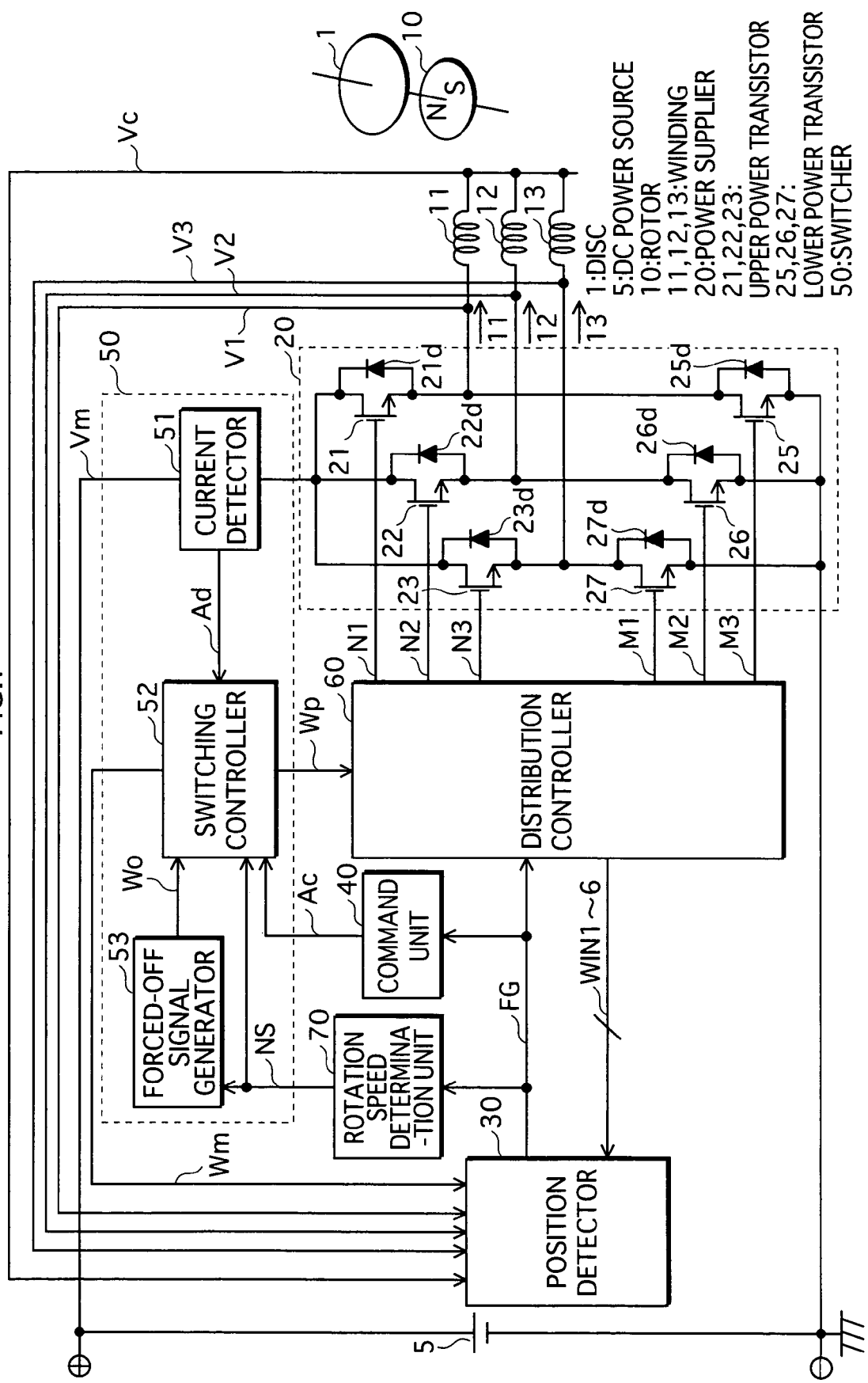
FIG. 7 shows the structure of a motor driver of a third embodiment.

FIG. 7 shows the structure of the motor driver of the third embodiment.

The structure shown in FIG. 7 differs from that shown in FIG. 1 in that it additionally includes a rotation speed judgment unit 70.

The detection pulse signal FG from the position detector 30 is input into the rotation speed determination unit 70, and the rotation speed determination unit 70 determines the rotation speed of the disc 1 and the rotor 10 using the position detection pulse signal FG. When the rotation speed of the disc 1 and the rotor 10 is determined to be at least a predetermined speed, the rotation speed determination unit 70 outputs a high level rotation speed determination signal NS. Note that the structure for judging the rotation speed of the disc 1 and the rotor 10 is not limited to being a structure in which the position detection pulse signal FG is used in the judgment. Any other structure by which the rotation speed can be judged is possible.

Figure 8:
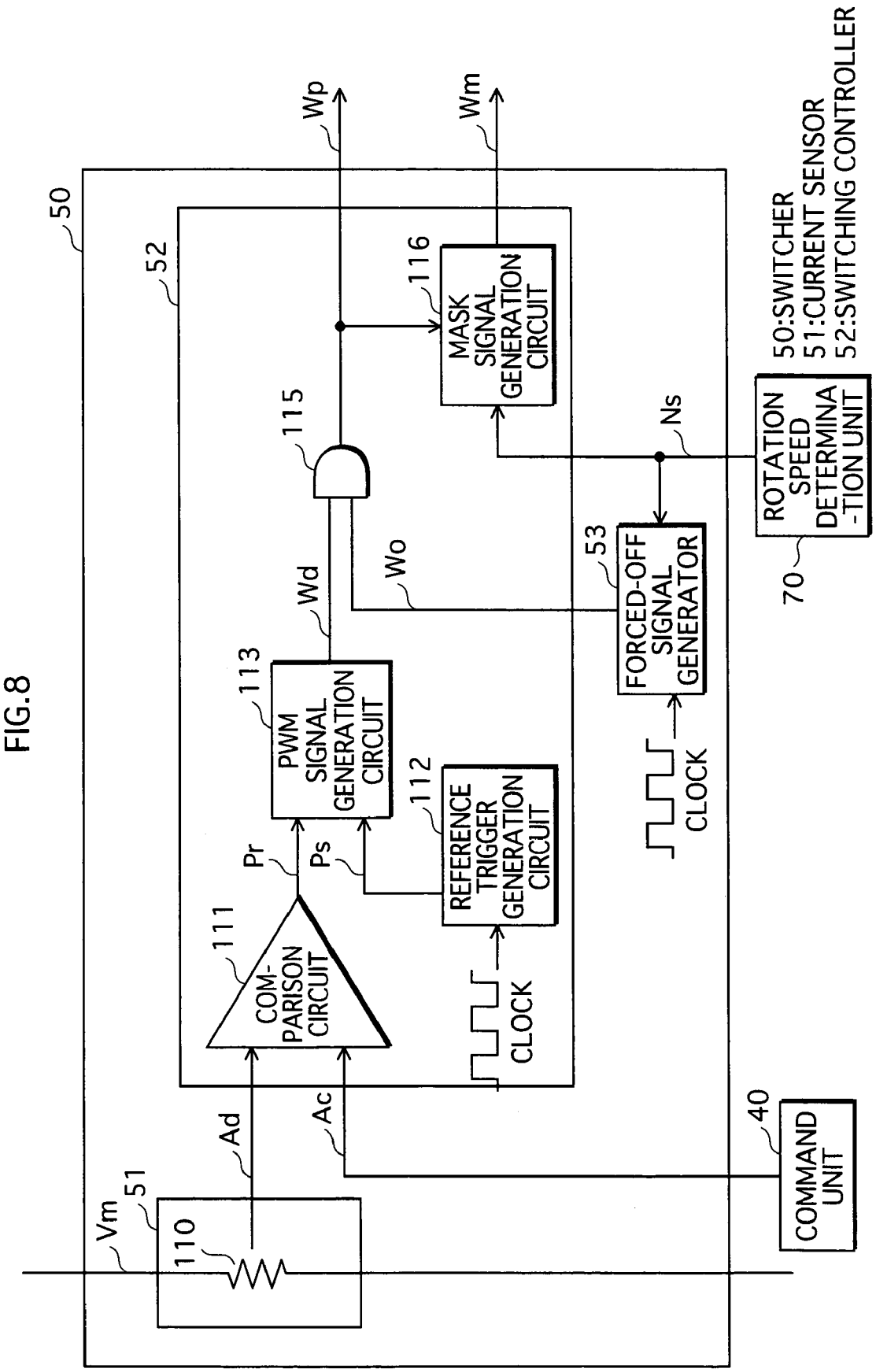
FIG. 8 shows detailed structure of a switcher 50.

FIG. 8 shows detailed structure of the switcher 50. The basic structure is the same as that in the motor driver of the first embodiment. The rotation speed determination signal NS is input into the forced-off signal generator 53, the switching controller 52, and the mask signal generator 116. Here, "first position detection mode" is used to refer to a detection mode used when the level of the rotation speed determination signal NS is low, in other words, position detection during a period from initial startup through to when rotation speed of the disc 1 and the rotor 10 reaches the predetermined rotation speed. Furthermore, "second position detection mode" is used to refer to a detection mode used when the level of the rotation speed determination signal NS is high, in other words, position detection while the rotation speed of the disc 1 and the rotor 10 is at least the predetermined rotation speed.

Figure 9:
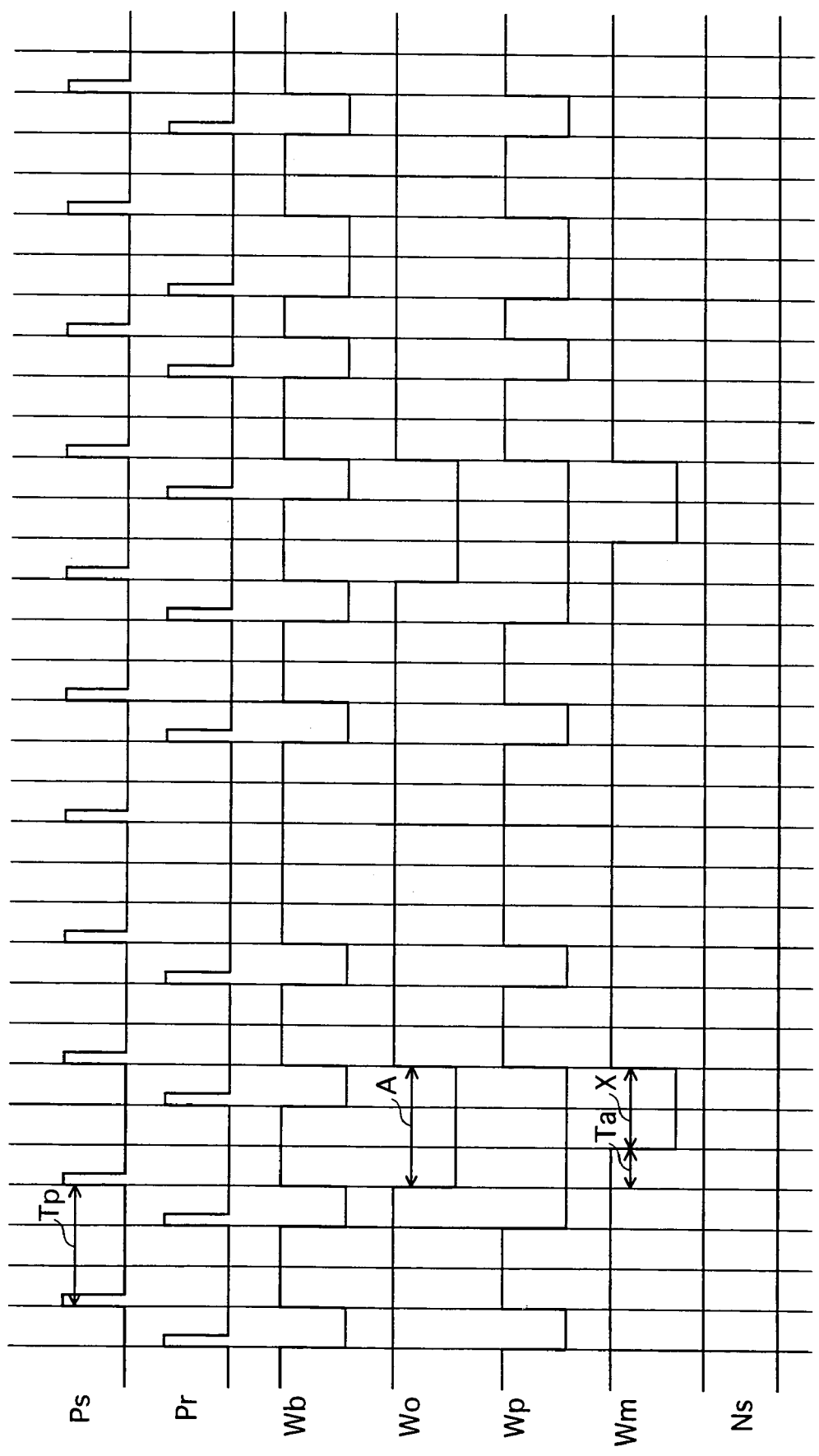
FIG. 9 shows the relationship between the waveform of each signal of the switching controller 52 in a first position detection mode.

FIG. 9 shows the relationship between waveforms of signals in the switching controller 52 in first position detection mode. In first position detection mode, the forced-off signal generator 53 outputs the forced-off signal Wo. Therefore, the PWM signal Wp is an AND output of the basic PWM signal Wb and the forced-off signal Wo. The upper power transistors 21, 22, and 23 of the power supplier 20 perform PWM operation, which includes forced-off operation, according to this PWM signal Wp. Meanwhile, the mask signal generator 116 outputs a mask signal Wm that masks during all segments other than the forced-off segment, and also masks for a first predetermined period Ta after the forced-off segment (This is the same as in the first embodiment.). In other words, position detection is possible only in a segment X, which is the forced-off segment A with the exclusion of the first predetermined period Ta. Note that the forced-off segment A must be set to be longer than the first predetermined period Ta that proceeds forced off (A>Ta).

Figure 10:
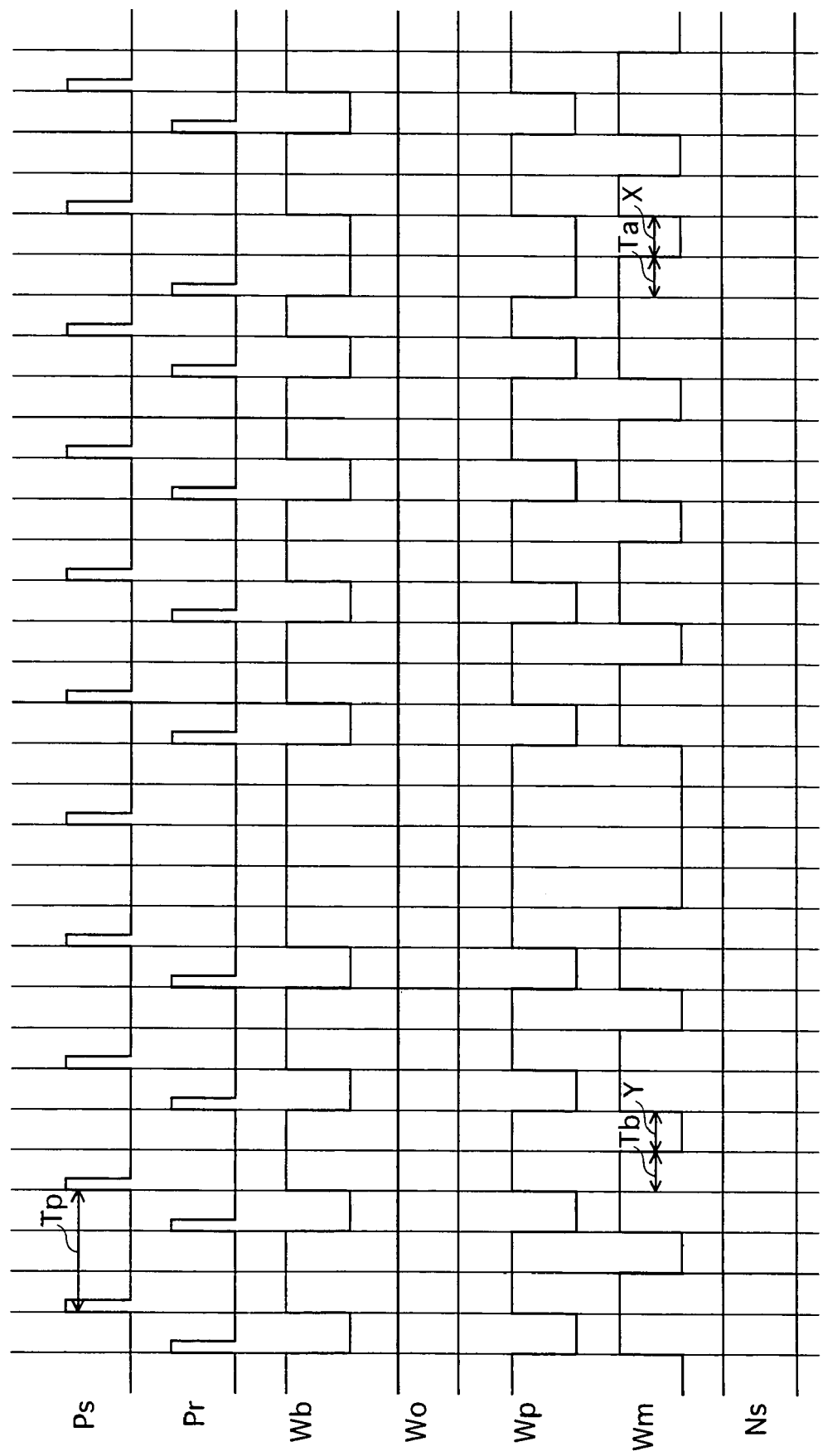
FIG. 10 shows the relationship between the waveform of each signal of the switching controller 52 in a second position detection mode.

FIG. 10 shows the relationship between waveforms of signals in the switching controller 52 in second position detection mode. In second position detection mode, the forced-off signal generator 53 outputs a high level signal. Therefore, since the PWM signal Wp is the AND output of the basic PWM signal Wb and the forced-off signal Wo (high level), the PWM signal Wp is the basic PWM signal Wb. The upper power transistors 21, 22, and 23 of the power supplier 20 perform PWM operation according to this PWM signal Wp. Meanwhile, the mask signal generator 116 is able to perform position detection with respect to the PWM signal Wp in a segment X and a segment Y. Here, the segment X is a segment during a PWM operation OFF segment with the exclusion of the first predetermined period Ta directly after proceeding to the OFF segment, and the segment Y is a segment in the PWM operation ON segment with the exclusion of a second predetermined period Tb directly proceeding to the ON segment.

In this way, stable PWM sensorless startup can be performed in first mode in which position detection operations are performed only in the forced-off segment from startup through to the rotation speed being reached. However, since the OFF segment is set relatively widely, there is a possibility that the driving current will fluctuate and position detection will be unstable. Therefore, the motor driver of the third embodiment has a structure in which the level of the forced-off signal Wo is high when the driving speed exceeds the predetermined driving speed, and fluctuations in the driving current are suppressed by prohibiting forced-off operation. In addition, the second detection mode in which the mask signal Wm enables position detection during both an ON segment and an OFF segment in PWM operation is used. Position detection is performed by switching between the first detection mode and the second detection mode depending on the rotation speed of the disc 1 and the rotor 10.

According to the stated structure, position detection is performed by switching between the first position detection mode and the second position detection mode according to the rotation speed determination signal NS that is output from the rotation speed determination unit 70. During the period from startup through to when the predetermined rotation speed in reached, stable PWM sensorless startup can be achieved because position detection is possible only in the forced-off segment. In addition, because forced-off is prohibited when the rotation speed is at least the predetermined rotation speed, and position detection is performed in a PWM operation ON segment and OFF segment, stable operation can also be achieved during ordinary driving.

Fourth Embodiment

Figure 11:
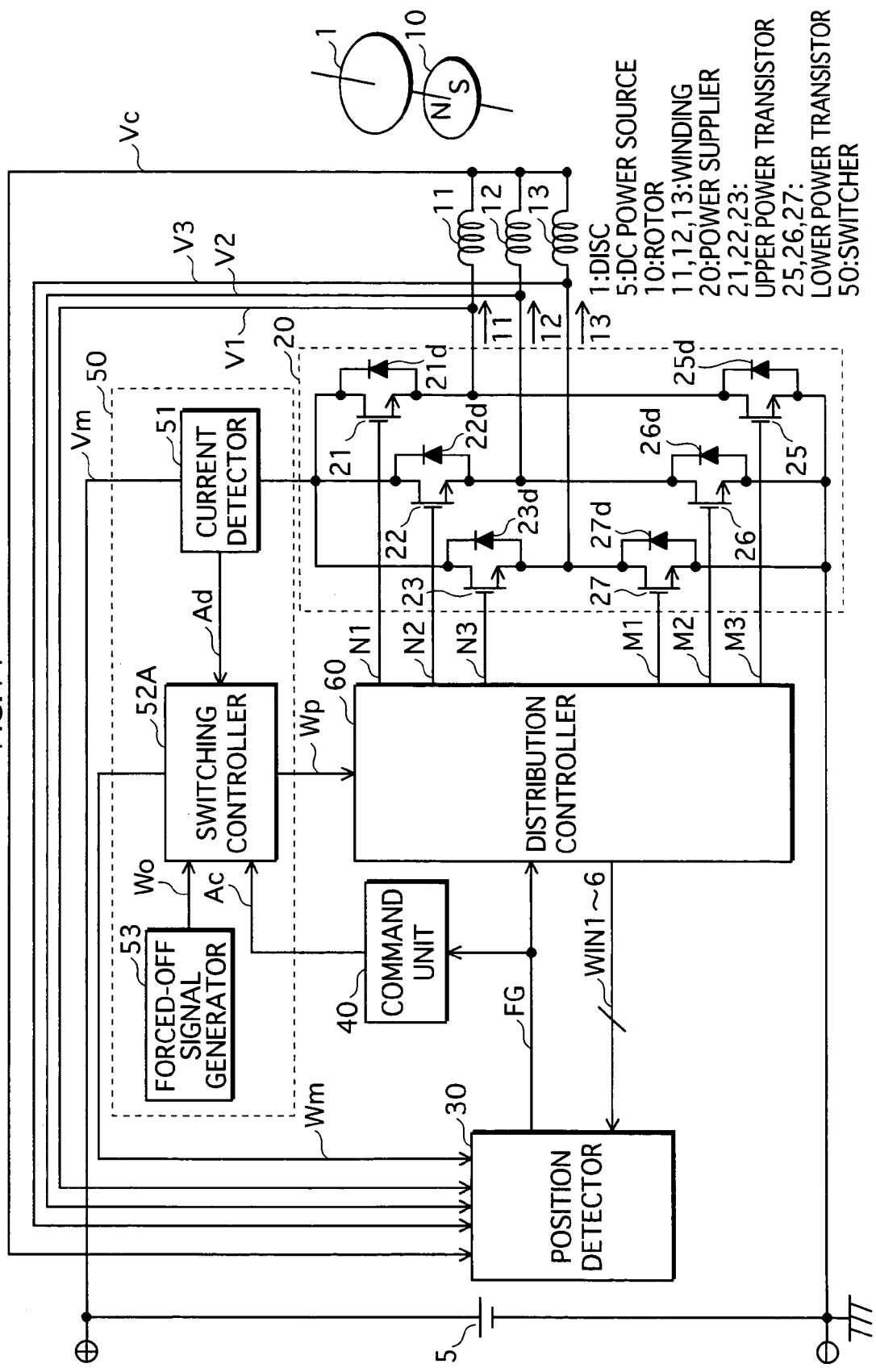
FIG. 11 shows the structure of a motor driver of a fourth embodiment.

FIG. 11 shows the structure of the motor driver of the fourth embodiment.

The structure shown in FIG. 11 differs from that shown in FIG. 1 in that the switcher 50 has a switching controller 52A.

Figure 12:
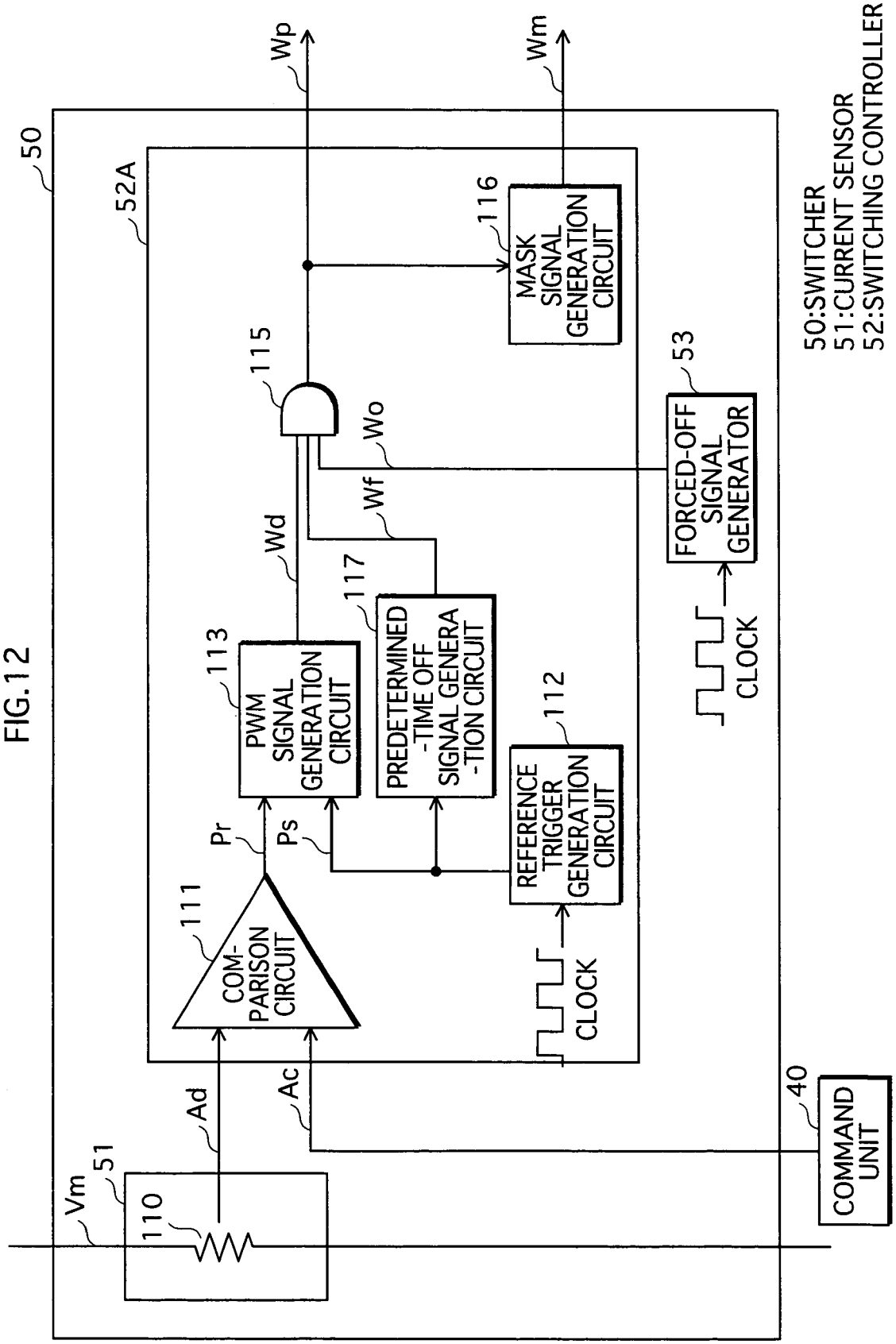
FIG. 12 shows detailed structure of a switching controller 52A.

FIG. 12 shows detailed structure of the switching controller 52A. The difference with the switching controller 52 of FIG. 1 is that the switching controller 52A additionally includes a predetermined-time off signal generator 117, and the AND gate 115 has three inputs.

Figure 13:
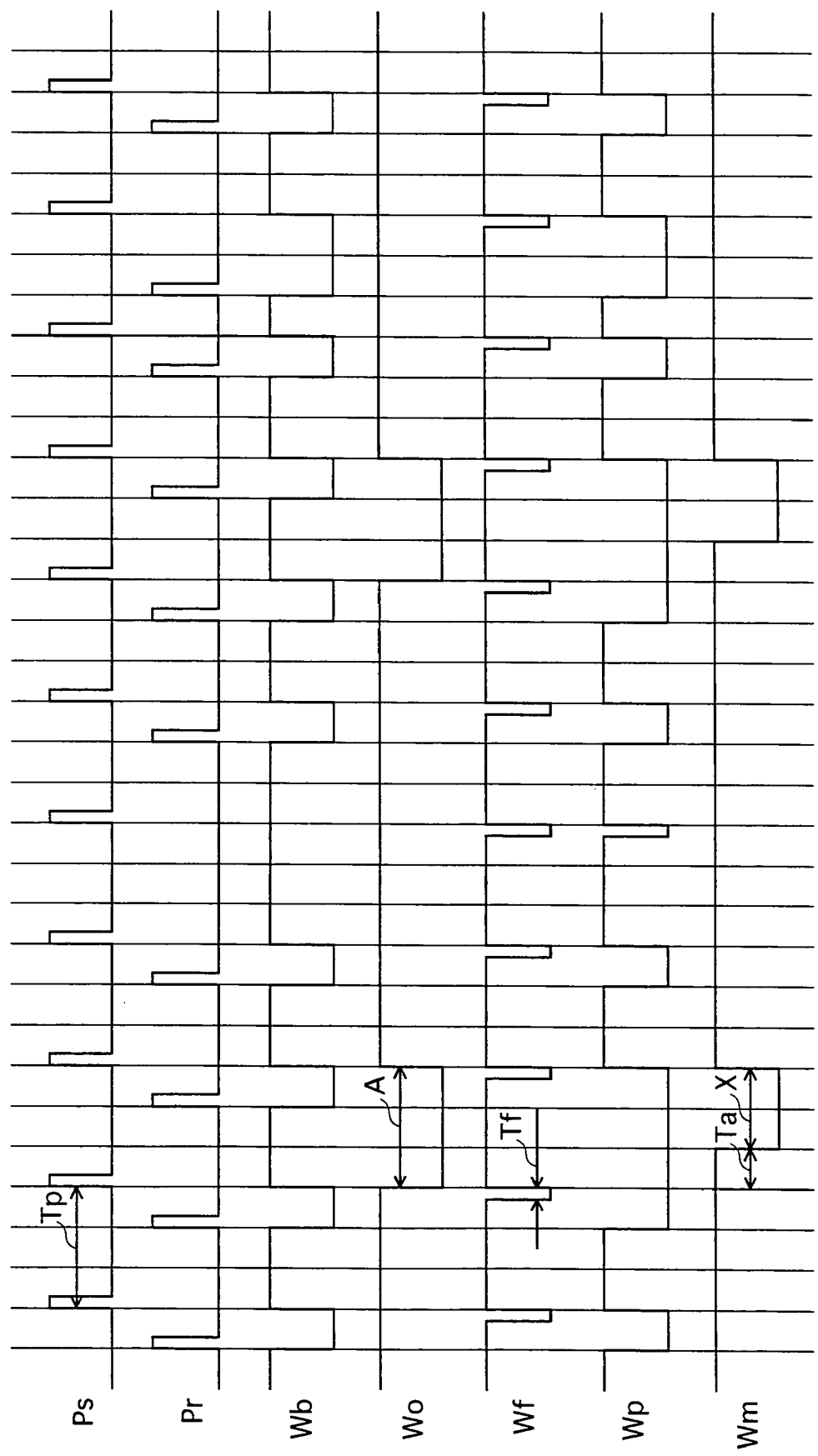
FIG. 13 shows the relationship between the waveform of each signal of the switching controller 52A.
Figure 14:
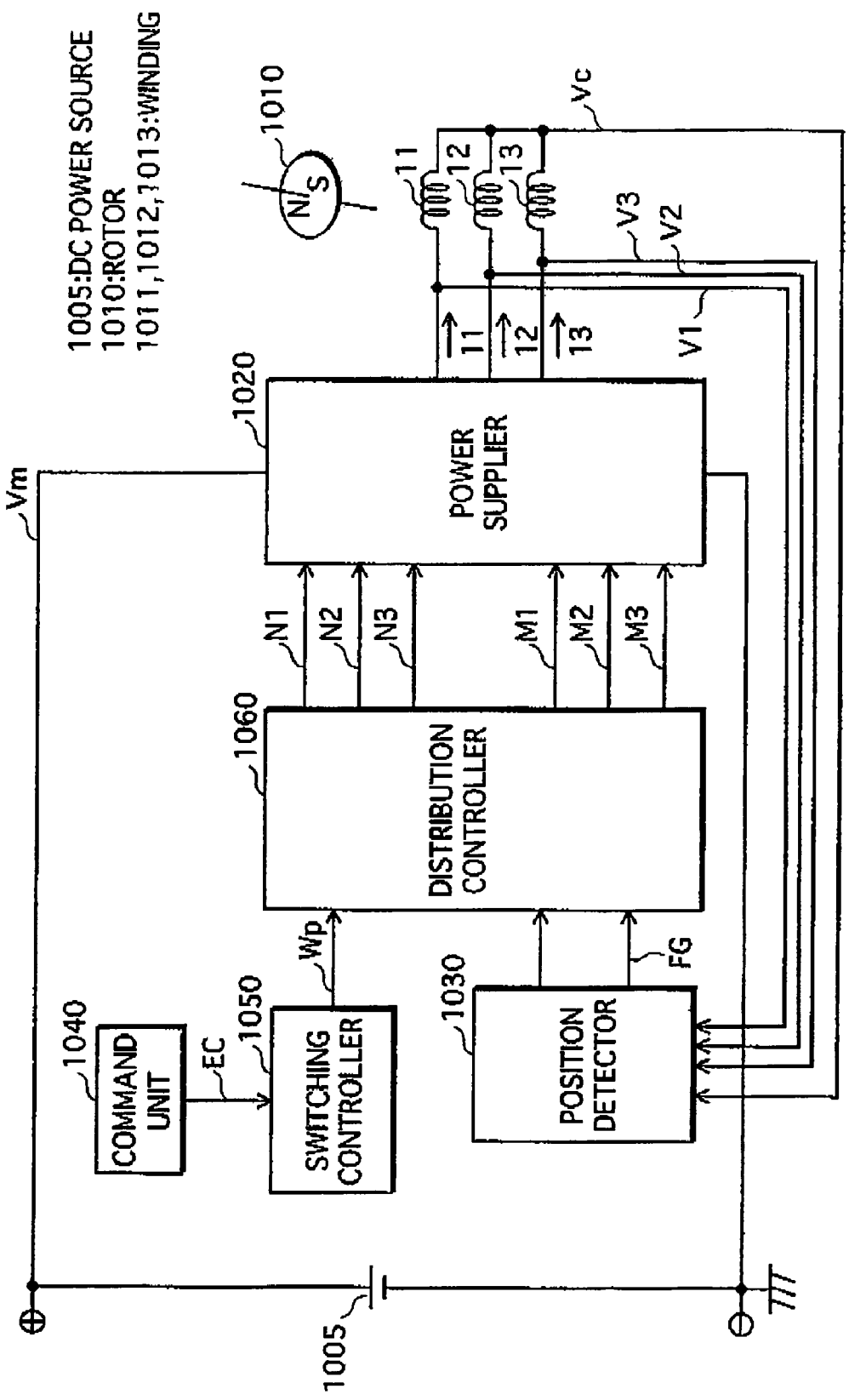
FIG. 14 shows the structure of a conventional motor driver.

FIG. 13 shows the relationship between waveforms of the signals in the switching controller 52A. In synchronization with the reference trigger signal Ps of the reference trigger generation circuit 112, the predetermined-time off signal generator 117 outputs a predetermined time OFF signal Wf for turning off the reference trigger signal Ps for a predetermined period Tf in the constant cycle Tp directly before the reference trigger signal Ps changes to ON. The AND gate 115 AND synthesizes the basic PWM signal Wb from the PWM signal generation circuit 113, the forced-off signal Wo from the forced off signal generator 53, and the predetermined-time off signal Wf from the predetermined-time off signal generation circuit 117, and outputs the resultant synthesized signal as the PWM signal Wp. Other structure is the same as that of the motor driver of the first embodiment.

With the PWM control of the motor driver of the present invention, the series of operations consisting of starting PWM operation according to the reference trigger signal Ps and completing PWM operation by detecting the peak value is performed every reference trigger signal Ps. In this kind of driver, fluctuations in the driving current are caused by fluctuations in rotation of the load (for example, the disc) that is driven. Furthermore, there is a tendency for erroneous operation, which is a phenomenon of a PWM operation of a particular cycle commencing before the PWM operation of the previous cycle is complete, in other words, "switching loss phenomenon", to occur.

With the described structure, PWM operation is always performed every constant cycle Tp, other than in forced-off segments, and therefore the phenomenon of switching loss can be prevented, and fluctuations in driving current can be reduced. In other words, stable driving is achieved.

INDUSTRIAL APPLICABILITY

The present invention can be used as a motor driving mechanism in optical disc apparatuses, magnetic disc apparatuses, and the like.

The invention claimed is:

1. A motor driver comprising:
   plural-phase windings;
   a plurality of transistors composed of a first group of transistors that operate as switches for supplying power from one terminal of a DC power unit to one end of each winding, and a second group of transistors that operate as switches for supplying power from another terminal of the DC power unit to another end of each winding;
   a position detector operable to detect a rotational position of a rotor, based on a terminal voltage of each winding;
   a current detector operable to output a current detection signal that is proportionate to a current supplied to the plural-phase windings;
   a switching controller that includes
   a forced-off signal generator operable to generate a forced-off signal that has a pulse width of a predetermined duration in a predetermined cycle that corresponds at least to a clock, and a PWM signal generator operable to generate a basic PWM signal in accordance with a result of comparing the current detection signal and a speed command signal, and
   is operable to generate a PWM signal by AND synthesizing the forced-off signal with the basic PWM signal; and
   a power distributor operable to generate first power distribution signals that correspond to a result of detection by the position detector, generate second power distribution signals by AND synthesizing a power distribution signal that corresponds to a result of detection by the position detector with the PWM signal from the switching controller, and output the generated first power distribution signals and the generated second power distribution signals, thereby causing the plurality of transistors to perform switching operation,
   wherein the switching controller further controls such that upper and lower transistors which switch the plural-phase windings are forced into a compulsory OFF state by means of the forced-off signal included in the PWM signal, and
   the position detector detects only while the upper and lower transistors are in the compulsory OFF state.

2. The motor driver of claim 1, wherein the position detector stops detecting for a predetermined period commencing at a point at which a change from the ON state to the OFF state occurs when the switching controller forces the OFF state, and
   the predetermined duration relating to the switching controller forcing the OFF state is longer than the predetermined period.

3. The motor driver of claim 1, further comprising:
   a rotation speed determiner operable to determine whether or not a rotation speed of the rotor is at least a predetermined speed,
   wherein, when the rotation speed is determined to be at least the predetermined speed, the position detector detects at least while the plurality of transistors are in the ON state.

4. The motor driver of claim 3, wherein when the rotation speed is determined to be at least the predetermined speed, the switching controller stops forcing the OFF state.

5. The motor driver of claim 3, wherein the position detector (a) when the rotation speed is determined not to be at least the predetermined speed, stops detecting for a first period commencing at a point at which a change from the ON state to the OFF state occurs when the switching controller forces the OFF state, and (b) when the rotation speed is determined to be at least the predetermined speed, stops detecting for a second period commencing at a point at which the plurality of transistors change from the OFF state to the ON state, and
   the predetermined duration relating to the switching controller forcing the OFF state is longer than the first period.

6. The motor driver of claim 3, wherein
   the rotation speed determiner performs the determination based on the result of the detection by the position detector.

7. The motor driver of claim 1 wherein
   the switching controller turns the plurality of transistors to the ON state of the high-frequency operation, and sets a predetermined duration for which the transistors are forced into the OFF state directly before the transistors are turned to the ON state.

8. The motor driver of claim 1, wherein
   the predetermined cycle in which the switching controller forces the OFF state is no greater than $\frac{1}{20000}$ seconds.

9. The motor driver of claim 1, wherein
   the position detector detects the position of the rotor by comparing a terminal voltage of each winding with a center tap voltage of all windings or with a pseudo-center tap voltage of the terminal voltages of the windings.

10. The motor driver of claim 1, wherein
   the cycle in which the switching controller forces the OFF state includes a segment in which a driving current of each winding is 0, and
   the position detector detects during the segment.

* * * * *